United States Patent
Seo et al.

(10) Patent No.: US 8,238,822 B2
(45) Date of Patent: Aug. 7, 2012

(54) METHOD FOR SELECTING THE INSTALLATION POSITION AND DIRECTION OF LINK ANTENNA IN INBUILDING RADIO FREQUENCY REPEATER AND CABLE APPARATUS USED IN THE SAME

(75) Inventors: Kyoung-Il Seo, Seoul (KR); Jin-Ho Choi, Gyeonggi-do (KR); Jung-Ho Lee, Seongnam (KR)

(73) Assignee: KT Corporation, Gyeonggi-do (KR)

( * ) Notice: Subject to any disclaimer, the term of this patent is extended or adjusted under 35 U.S.C. 154(b) by 1162 days.

(21) Appl. No.: 12/063,546

(22) PCT Filed: Aug. 11, 2006

(86) PCT No.: PCT/KR2006/003162
§ 371 (c)(1),
(2), (4) Date: Feb. 11, 2008

(87) PCT Pub. No.: WO2007/021105
PCT Pub. Date: Feb. 22, 2007

(65) Prior Publication Data
US 2008/0274693 A1 Nov. 6, 2008

(30) Foreign Application Priority Data
Aug. 12, 2005 (KR) ........................ 10-2005-0074237

(51) Int. Cl.
*H04B 7/14* (2006.01)
(52) U.S. Cl. .... 455/25; 455/575.7; 455/274; 455/562.1; 370/334

(58) Field of Classification Search ............... 455/556.1, 455/566, 575.7, 90.1–90.3, 272–279.1, 562.1, 455/553.1, 73, 88, 25; 379/419–440; 370/338, 370/334
See application file for complete search history.

(56) References Cited

U.S. PATENT DOCUMENTS
6,137,787 A * 10/2000 Chawla et al. ................ 370/337
(Continued)

FOREIGN PATENT DOCUMENTS
JP 03-101503 4/1991
(Continued)

*Primary Examiner* — Sujatha Sharma
(74) *Attorney, Agent, or Firm* — IP Legal Services, LLC

(57) ABSTRACT

The present invention relates to a method for selecting an installation position of a link antenna of an in-building RF repeater, a cable device thereof, and a terminal. The method selects the position for measuring the greatest Ec/Io by using directivity of the link antenna in an area for installing the link antenna. The link antenna is installed at the selected position. The direction with the greatest Ec/Io that is measured by using directivity of the link antenna is fixed to be a desired direction from among target directions to be directed by the link antenna. In this instance, measurement of Ec/Io by using directivity of the link antenna is performed by a mobile station connected to the link antenna through an access cable. Accordingly, the link antenna can be installed at the optimized position and in the optimized direction. Hence, the Ec/Io within the building is substantially reduced.

20 Claims, 15 Drawing Sheets

U.S. PATENT DOCUMENTS

| | | | |
|---|---|---|---|
| 6,463,089 B1 * | 10/2002 | Chauncey et al. | 375/131 |
| 6,501,965 B1 * | 12/2002 | Lucidarme | 455/562.1 |
| 6,836,675 B2 * | 12/2004 | Zhang | 455/562.1 |
| 6,993,287 B2 * | 1/2006 | O'Neill | 455/11.1 |
| 7,324,471 B2 * | 1/2008 | Kim | 370/320 |
| 7,440,785 B2 * | 10/2008 | Steer et al. | 455/575.7 |
| 2001/0046840 A1 | 11/2001 | Kim | |
| 2002/0028655 A1 | 3/2002 | Rosener et al. | |
| 2005/0202859 A1 * | 9/2005 | Johnson et al. | 455/575.7 |
| 2008/0200122 A1 * | 8/2008 | Mann | 455/41.2 |
| 2010/0291949 A1 * | 11/2010 | Shapira et al. | 455/456.1 |

FOREIGN PATENT DOCUMENTS

| | | |
|---|---|---|
| JP | 04-015381 U | 2/1992 |
| JP | 05-259958 A | 10/1993 |
| JP | 09-121178 | 5/1997 |
| JP | 09-181665 | 7/1997 |
| JP | 10 214525 | 8/1998 |
| JP | 2000 134783 | 5/2000 |
| JP | 2001 077739 | 3/2001 |
| JP | 2002 084225 | 3/2002 |
| JP | 2002 185380 | 6/2002 |
| JP | 2002 353867 | 12/2002 |
| JP | 2003 101503 | 4/2003 |
| JP | 2003 347843 | 12/2003 |
| JP | 2004 015381 | 1/2004 |
| JP | 2005 012329 | 1/2005 |
| JP | 2005 045728 | 2/2005 |
| JP | 2009 121178 | 6/2009 |
| JP | 2009 181665 | 8/2009 |
| KR | 10-2002-0072004 A | 9/2002 |
| KR | 10-2005-0008003 A | 1/2005 |

* cited by examiner

[FIG. 5]
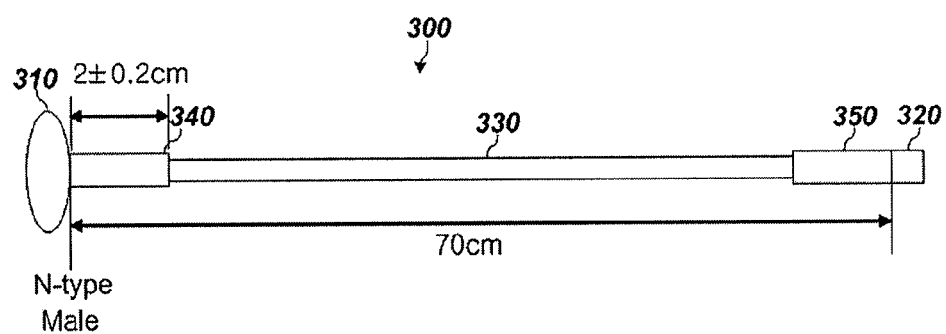

[FIG. 6]
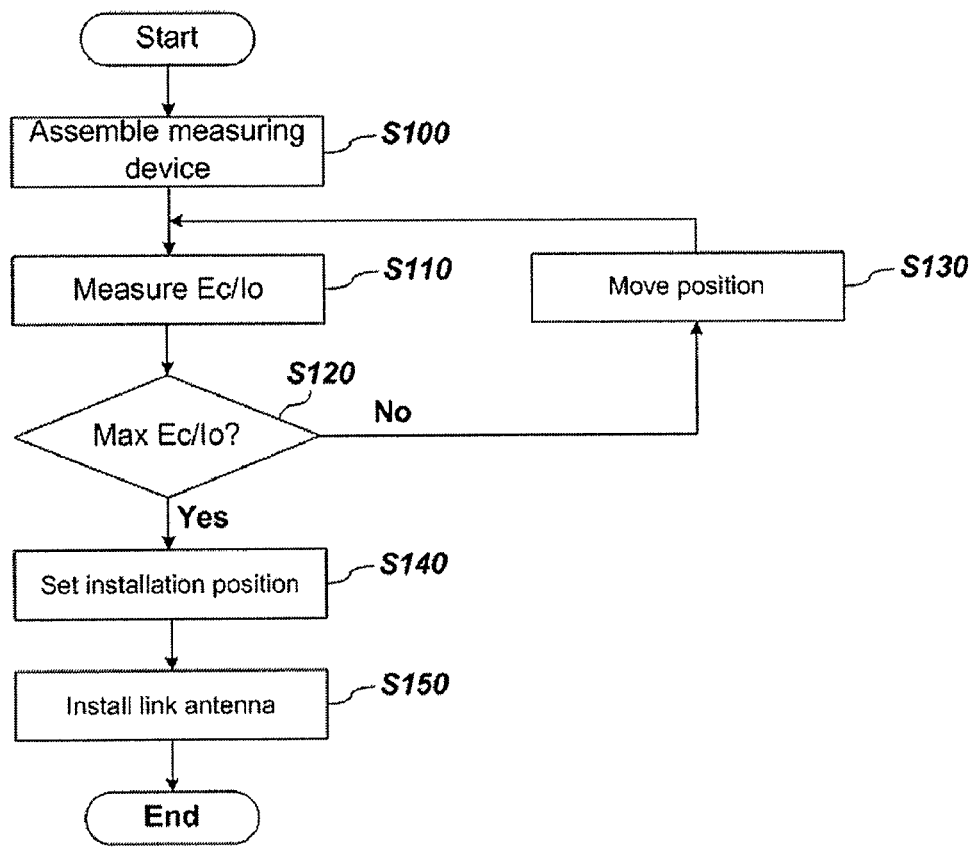

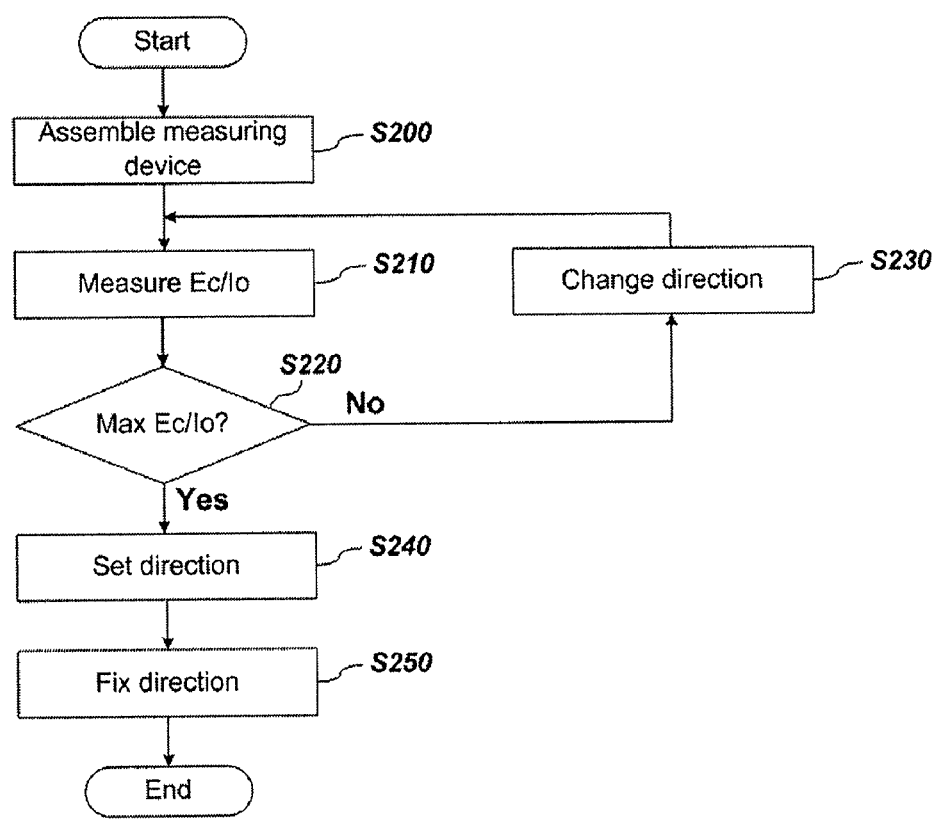
[FIG. 7]

[FIG. 8]
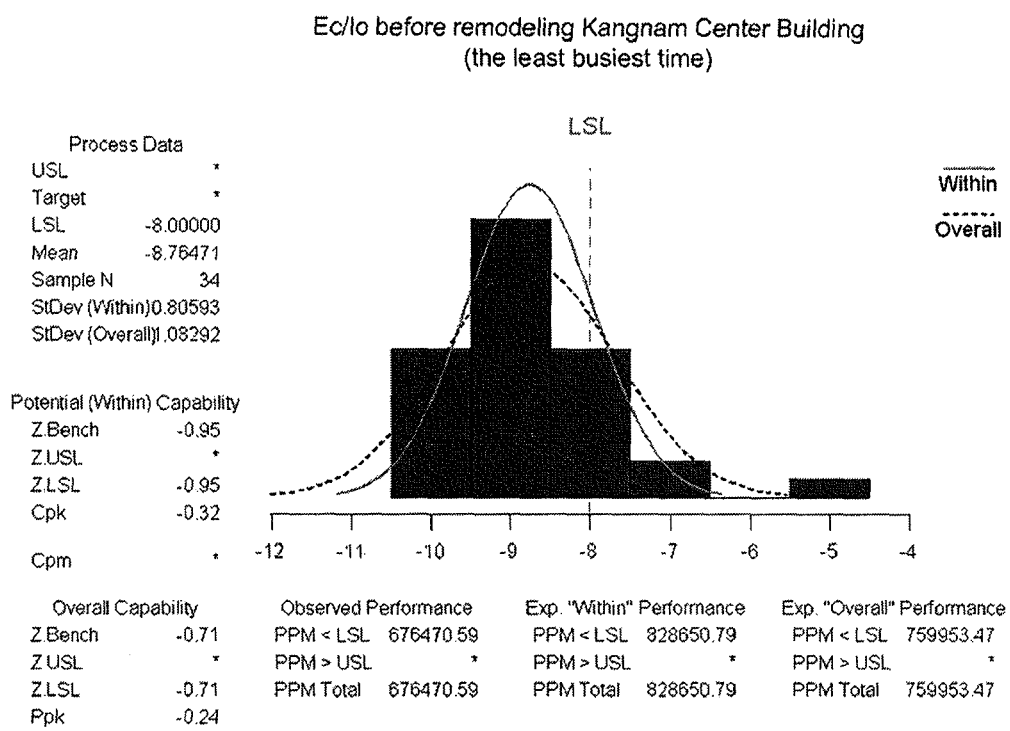

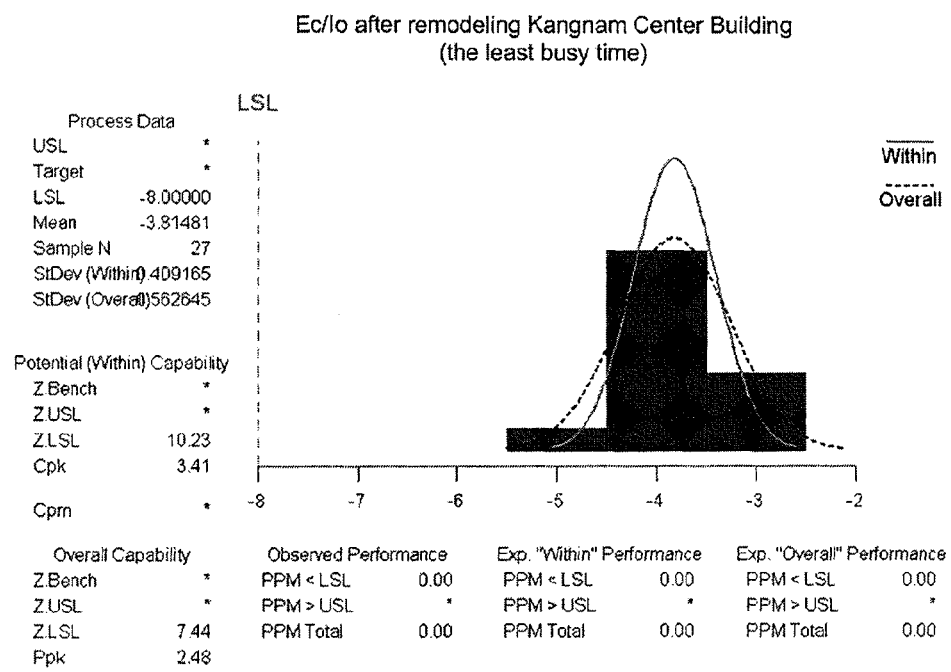
[FIG. 9]

[FIG. 10]
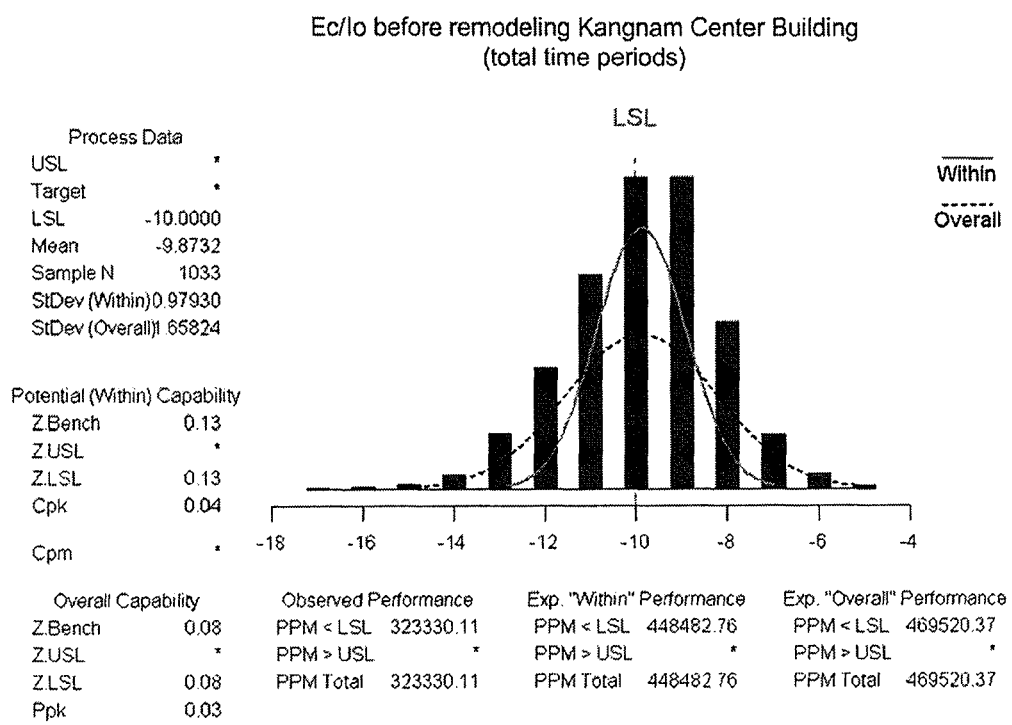

[FIG. 11]
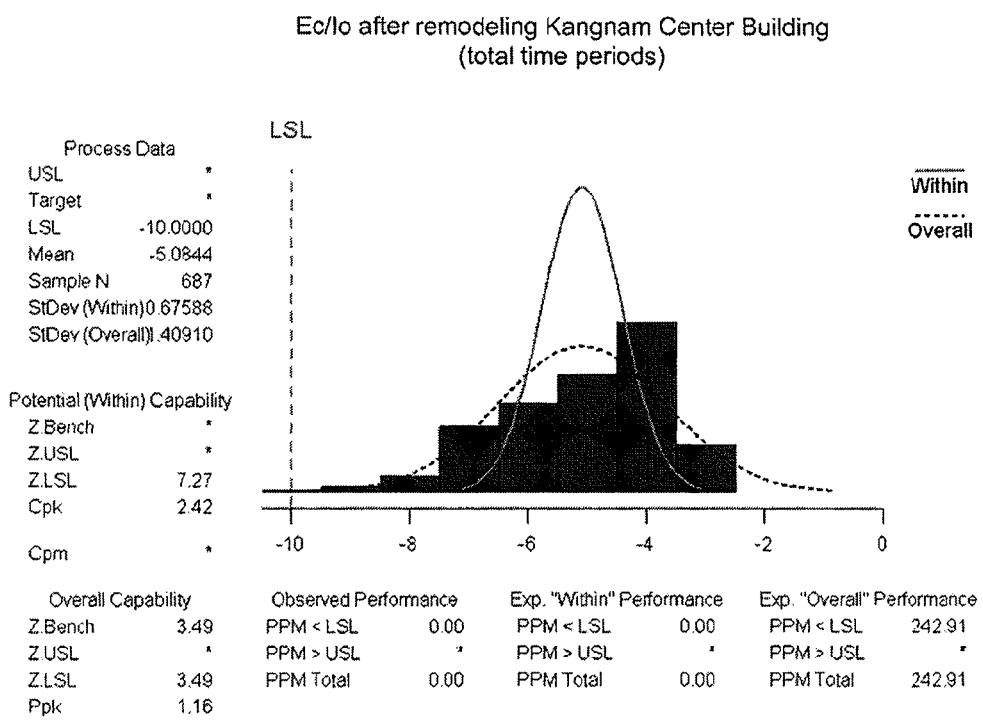

[FIG. 12]

| Total improved results | Total least busy time | Total times (Average of 30 days) |
|---|---|---|
| Sigm Level | 70% Part 6 Sigma Achievement | 2 Sigma Improvement |
| Ec/Io Improvement | 3.2dB Improvement (-7.7dB→-4.5dB) | 3.5dB Improvement (-9dB→-5.5dB) |
| In-building Data Throughput | — | 47% Improvement (178Kbps→261 Kbps) |
| RSSI Improvement | 2.8 dB Improvement (-64.6dBm→-61.8dBm) | 2.4 dB Improvement (-64.0dBm→-61.6dBm) |
| Tx_adj | 3.4 dB Improvement (-4.5dB→-7.9dB) | 4 dB Improvement (-1.9dB→-5.9dB) |
| Tx_pwr | 6.1 dB Improvement (-15.9dBm→-22.0dBm) | 6.3 dB Improvement (-13.9dBm→-20.2dBm) |

| June 20th ~ July 20th iReMS | | Improved states | | | | Sigm Level | | Ec/Io | | Tx_adj | | RSSI | | Throughput(Kbps) | |
|---|---|---|---|---|---|---|---|---|---|---|---|---|---|---|---|
| Ref of the least busy time (4a.m. to 5a.m.) | Sigma Level | Ec/Io | Tx_Pwr | RSSI | Throughput | Before | After | Before | After | Before | After | Before | After | Before | After |
| 10 parts (at the least busy time) | 2.04 | 3.2 | 6.1 | 2.8 | — | 1.17 | 3.75 | -7.7 | -4.5 | -4.5 | -7.9 | -64.6 | -61.8 | — | — |
| Kangnam Center Bld (18th floor) | 6 | 4.9 | 7.0 | 2.9 | 47% | 0.79 | * | -8.8 | -3.8 | -8.1 | -12.2 | -62.6 | -59.7 | — | — |
| Yoksam Youth Training (6th floor)★ | 6 | 4.8 | 9.8 | 8.0 | 36% | 0.87 | * | -8.6 | -3.8 | 1.4 | -0.5 | -69.6 | -61.2 | — | — |
| Dongyang Paragon Apt (13th floor) | 6 | 3.9 | 3.1 | 5.5 | 23% | 1.66 | * | -7.9 | -4.0 | -5.8 | -3.3 | -65.7 | -60.2 | — | — |
| Yoksam Bld (10th floor) | 6 | 3.7 | 9.5 | 3.2 | 15% | 1.6 | * | -7.8 | -4.1 | -3.6 | -9.8 | -64.5 | -61.3 | — | — |
| Co-up Resident Hotel (10th floor)★ | 6 | 3.3 | 25.5 | 6.8 | 128% | 2.21 | * | -7.4 | -4.1 | -5.6 | -24.3 | -65.5 | -58.7 | — | — |
| Allianz Life Bld (10th floor) | 5.26 | 3.2 | 1.9 | 1.4 | 50% | 1.75 | 7.01 | -7.8 | -4.6 | 0.1 | -0.4 | -64.2 | -62.8 | — | — |
| LG Sunneuong Ekrat (6th floor)★ | 6 | 2.7 | 4.3 | 5.8 | 58% | 3.49 | * | -5.9 | -3.2 | -6.8 | -5.3 | -65.1 | -59.3 | — | — |
| Cheil Med B (12th floor)★ | 1.68 | 2.6 | 8.0 | 1.2 | 23% | 2.07 | 3.75 | -7.6 | -5.0 | -1.6 | -8.5 | -61.8 | -60.7 | — | — |
| Chung-gu Vilart (10th floor) | 2.17 | 2.5 | -4.8 | -1.8 | 95% | 2.24 | 4.41 | -6.8 | -4.2 | -11.2 | -8.2 | -69.5 | -71.3 | — | — |
| Seowon Bld (7th floor) | 1.83 | 2.5 | 2.2 | -1.4 | 27% | 0.14 | 1.97 | -9.1 | -6.6 | -3.5 | -7.1 | -57.9 | -59.4 | — | — |

| June 20th ~ July 20th iReMS | | Improved states | | | | Sigm Level | | Ec/Io | | Tx_adj | | RSSI | | Throughput(Kbps) | |
|---|---|---|---|---|---|---|---|---|---|---|---|---|---|---|---|
| Ref of total time (4a.m. to 5a.m.) | Sigma Level | Ec/Io | Tx_Pwr | RSSI | Throughput | Before | After | Before | After | Before | After | Before | After | Before | After |
| 10 parts (total time) | 1.87 | 3.4 | 6.3 | 2.4 | 47% | 2.04 | 3.91 | -9.0 | -5.5 | -1.9 | -5.9 | -64.0 | -61.6 | 178 | 261 |
| Kangnam Center Bld (18th floor) | 3.41 | 4.8 | 7.0 | 2.5 | 36% | 1.58 | 4.99 | -9.9 | -5.1 | -6.2 | -10.7 | -62.7 | -60.3 | 209 | 285 |
| Yoksam Youth Training (6th floor)★ | 5.79 | 5.4 | 9.9 | 8.1 | 23% | 1.42 | 7.21 | -10.1 | -4.7 | 3.7 | 1.8 | -68.8 | -60.7 | 206 | 254 |
| Dongyang Paragon Apt (13th floor) | 3.39 | 3.3 | 4.7 | 4.7 | 15% | 2.68 | 6.07 | -8.4 | -5.1 | -1.9 | -1.8 | -64.0 | -59.3 | 206 | 236 |
| Yoksam Bld (10th floor) | 4.41 | 4.6 | 10.3 | 3.1 | 128% | 1.65 | 6.06 | -9.6 | -5.0 | -0.2 | -7.3 | -64.6 | -61.4 | 121 | 275 |
| Co-up Resident Hotel (10th floor)★ | 5.35 | 4.1 | 25.9 | 6.0 | 50% | 2.26 | 7.71 | -8.9 | -4.7 | -3.5 | -23.3 | -64.8 | -58.7 | 183 | 275 |
| Allianz Life Bld (10th floor) | 2.08 | 2.9 | 2.0 | 1.5 | 58% | 2.47 | 4.55 | -8.7 | -5.8 | 2.1 | 1.5 | -64.4 | -63.0 | 174 | 275 |
| LG Sunneuong Ekrat (6th floor)★ | 1.36 | 2.5 | 4.2 | 5.6 | 23% | 3.29 | 4.65 | -7.2 | -4.7 | -4.3 | -2.8 | -63.8 | -58.2 | 206 | 254 |
| Cheil Med B (12th floor)★ | 1.98 | 2.8 | 8.3 | 0.4 | 95% | 2.23 | 4.21 | -9.0 | -6.1 | 1.0 | -7.0 | -61.6 | -61.2 | 141 | 275 |
| Chung-gu Vilart (10th floor) | 0.51 | 1.7 | -4.9 | -3.0 | 27% | 2.62 | 3.13 | -7.9 | -6.2 | -7.7 | -5.8 | -67.8 | -70.8 | 186 | 236 |
| Seowon Bld (7th floor) | 1.16 | 3.0 | 2.2 | -1.3 | 28% | 1.48 | 2.64 | -10.0 | -7.1 | -2.0 | -5.6 | -57.8 | -59.1 | 199 | 254 |

★Indicates the place where a yagi antenna is installed, *indicates zero defects state

[FIG. 13]
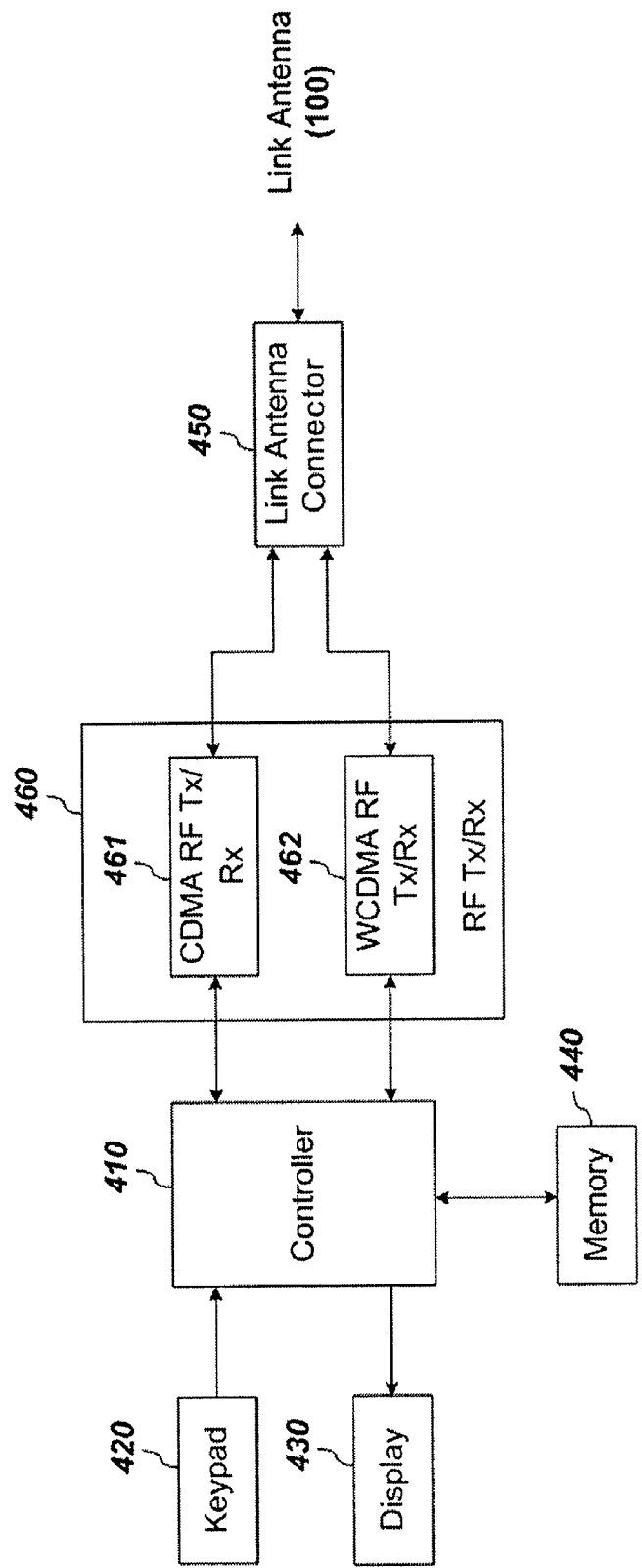

[FIG. 14]
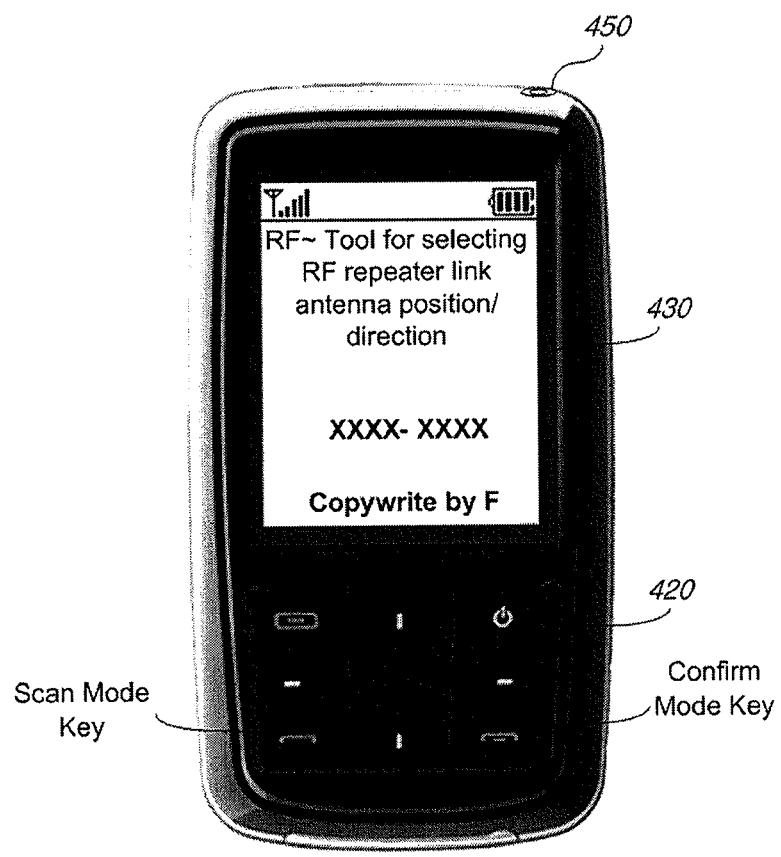

[FIG. 15]
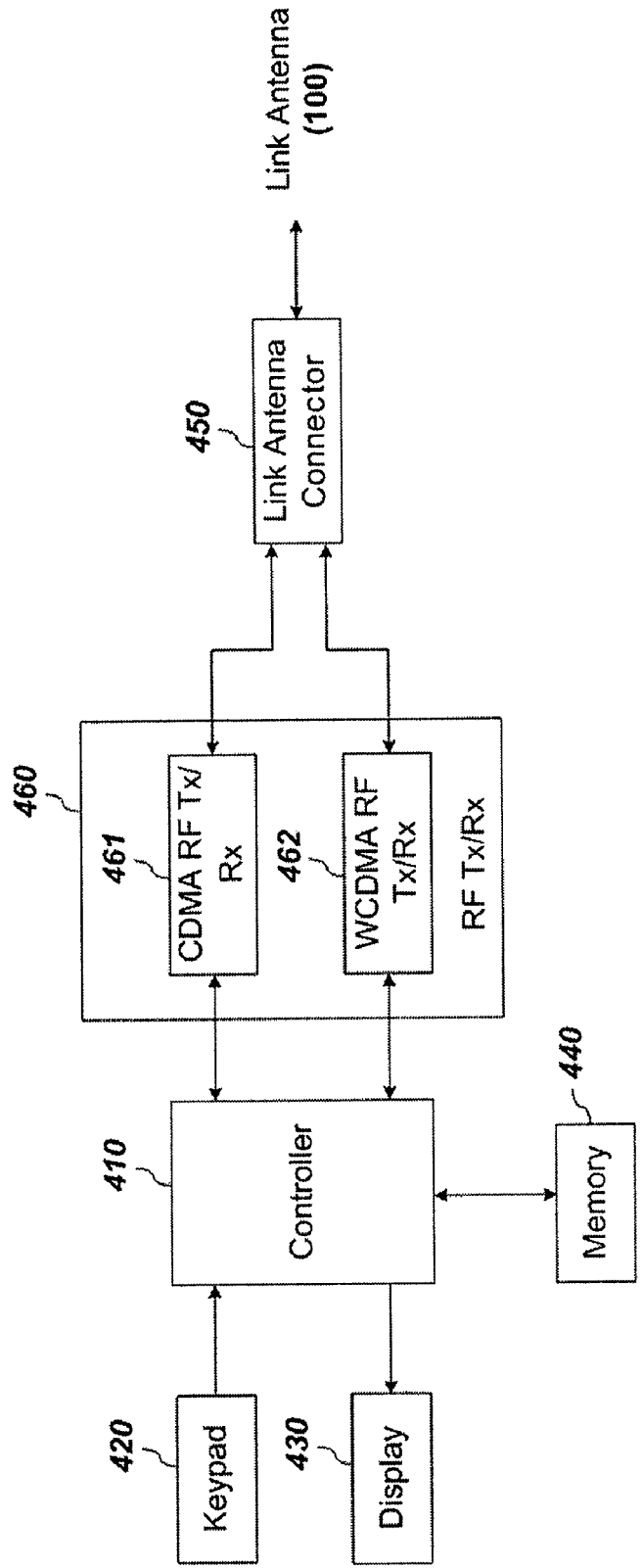

METHOD FOR SELECTING THE INSTALLATION POSITION AND DIRECTION OF LINK ANTENNA IN INBUILDING RADIO FREQUENCY REPEATER AND CABLE APPARATUS USED IN THE SAME

CROSS REFERENCE TO RELATED APPLICATIONS

This application is a national stage application filed under 35 USC 371 of International Application No. PCT/KR2006/003162, filed Aug. 11, 2006, which claims priority from Korean Patent Application No. 10-2005-0074237, filed Aug. 12, 2005.

BACKGROUND OF THE INVENTION (a) Field of the Invention

The present invention relates to a link antenna of an in-building radio frequency (RF) repeater, and in particular, relates to a method for selecting the installation position of a link antenna of an in-building RF repeater and a cable device and a terminal thereof.

(b) Description of the Related Art

In general, radio waves generated by a base station in a mobile communication system do not easily reach inner spaces of large buildings, rear parts of mountains or hills, tunnels, or subways, and hence, these areas may cause calling problems to mobile communication. Therefore, blanket areas are generated because of the position of base station or geographical problems. In order to solve the blanket areas, cheap repeaters that cover the blanket areas with weak radio waves are currently used. Particularly, an in-building RF repeater solves the problem of blanket area in the building, and as shown in FIG. 1, a donor unit 5 is installed in the outer part of a building 3, particularly a rooftop, and a remote unit 9 that is connected to the donor unit 5 through a coaxial cable 7 is installed within the building 3 so that the mobile communication service may be provided within the building. In this instance, the donor unit 5 transmits and receives radio signals to/from the base station 1 so that the donor unit 5 and the remote unit 9 form an in-building RF repeater.

Here, in the in-building RF repeater, an RF antenna for transmitting and receiving RF signals to/from the base station 1 is called a link antenna, and the Yagi antenna is generally used. The Yagi antenna is invented by two Japanese, Yagi and Unoda, and is a directional beam antenna that is most frequently used recently. Since the link antenna for the in-building RF antenna has directivity, the direction of the link antenna is an important factor that directly controls the efficiency of the mobile communication service. Also, a patch antenna, a sector antenna, and a parabolic antenna in addition to the Yagi antenna are applicable to the link antenna.

A general mobile communication terminal displays various terminals states to the user so that he may know the terminal states at a specific mode wherein the terminal states include the received signal strength indication (RSSI) and the energy per chip over interface noise (Ec/Io).

Therefore, when an in-building RF repeater is installed conventionally, an installer can use Ec/Io information displayed on the terminal when he determines the position for installing a link antenna on the rooftop of a building.

That is, the installer of a link antenna selects the position at which the link antenna will be installed while viewing the information such as RSSI and Ec/Io displayed on a terminal that provides a mobile communication service on the rooftop of the building.

The installer installs the link antenna and connects the coaxial cable 7 connected to the remote unit 9 installed within the building to a feeding cable of the link antenna to thus install the in-building RF repeater.

Another installer in the building communicates with the installer outside the building and selects the optimized direction of the link antenna while checking the Ec/Io displayed on the terminal for receiving a mobile communication service through the remote unit 9.

The above-noted process is the optimized method for installing the link antenna of the in-building RF repeater in the prior art.

However, since signals transmitted by a plurality of sectors (i.e., pseudo noise (PN)) are provided on the outside of the building where the link antenna is installed, that is, the rooftop, it is not allowed to select the optimized position by using the information (i.e., Ec/Io) measured from a mobile terminal having an omni-directional antenna when selecting the position for selecting the link antenna. That is, the problem occurs because the position is selected by using a general mobile communication terminal having an omni-directional antenna that is different from the link antenna's RF pattern.

Further, since it is required to manually select the direction of the link antenna by calling another installer who is positioned in the building after the link antenna is installed at the position that is not optimized or after the same is incidentally installed at the optimized position, a log time is needed to finish installation on the link antenna and the cost of installation and maintenance on the link antenna is increased since at least two installers are needed.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a method for selecting an installation position of a link antenna of an in-building RF repeater having advantages of providing an optimized position in a building and installation of a link antenna in the optimized direction at the same position.

The present invention has been made in another effort to provide a cable device used for the optimized position in the building and installation of the link antenna in the optimized direction at the same position.

The present invention has been made in another effort to provide a terminal used for installing a link antenna.

In one aspect of the present invention, a method for selecting an installation position of a link antenna of an in-building RF repeater in a terminal connected to the link antenna includes a) measuring a communication state value by using directivity of the link antenna at a predetermined position within a target area for installing the link antenna; b) comparing a previously measured communication state value with the communication state value that is measured by repeating the measurement of a) at another position within the target area; and c) selecting the position with the greatest communication state value as a position for installing the link antenna.

In another aspect of the present invention, a method for selecting a direction of a link antenna of an in-building RF repeater in a terminal connected to the link antenna includes a) measuring a communication state value by using directivity of the link antenna in a predetermined direction within a target area to be directed by the link antenna; b) comparing a previously measured communication state value with the communication state value that is measured by repeating the measurement of a) in another direction within the target area; and c) selecting the direction with the greatest communication state value as a direction to be directed by the link antenna The measuring of a communication state value by using directivity of the link antenna in a) is performed by a terminal connected to the link antenna through a predetermined access cable.

In another aspect of the present invention, a cable device includes an N-type connector connectable to a feeder of a link antenna of an in-building RF repeater; an RF jack connectable to an RF port for controlling RF transmission with a terminal that generates mobile communication traffic through the link antenna; and an RF cable connected between the N-type connector and the RF jack, wherein the terminal transmits RF signals between the link antenna and the terminal to control measuring of communication state values by using directivity of the link antenna.

In another aspect of the present invention, a terminal for selecting an installation position of a link antenna of an in-building RF repeater includes a keypad for receiving and transmitting a user instruction for selecting an installation position of the link antenna; a display for displaying communication state values for displaying the terminal's states and performance; a link antenna connector connectable to the link antenna so that RF signals may be transmitted between the link antenna and the terminal; a wireless transmitting/receiving unit for transmitting/receiving RF signals to/from the link antenna through the link antenna connector; and a controller for measuring the terminal's communication state value through the link antenna connected to the wireless transmitting/receiving unit through the link antenna connector when a user instruction is input through the keypad.

BRIEF DESCRIPTION OF THE DRAWINGS

FIG. 5 shows a detailed block diagram for an access cable shown in FIG. 3.

FIG. 6 shows a method for selecting an installation position of a link antenna of an in-building RF repeater according to an embodiment of the present invention.

FIG. 7 shows a flowchart of a method for selecting a direction of a link antenna of an in-building RF repeater according to an embodiment of the present invention.

FIG. 8 shows a measurement result graph before improvements with reference to the time with the number of least users in the Kangnam Center Building from among ten specific places according to an embodiment of the present invention.

FIG. 9 shows a measurement result graph after improvements with reference to the time with the number of least users in the Kangnam Center Building from among ten specific places according to an embodiment of the present invention.

FIG. 10 shows a measurement result graph before improvements with reference to the total time in the same Kangnam Center Building of FIG. 8 and FIG. 9.

FIG. 11 shows a measurement result graph after improvements with reference to the total time in the same Kangnam Center Building of FIG. 8 and FIG. 9.

FIG. 12 shows comparison results of measurement data before improvement and measured data after improvement with reference to the least busy time and the total time at the ten places where the measurement process is performed according to an embodiment of the present invention.

FIG. 13 shows a dedicated terminal for selecting an installation position of a link antenna according to an embodiment of the present invention.

FIG. 14 shows a case of the dedicated terminal shown in FIG. 13.

FIG. 15 shows another dedicated terminal for selecting an installation position of a link antenna according to an embodiment of the present invention.

DETAILED DESCRIPTION OF THE EMBODIMENTS

Figure 1:
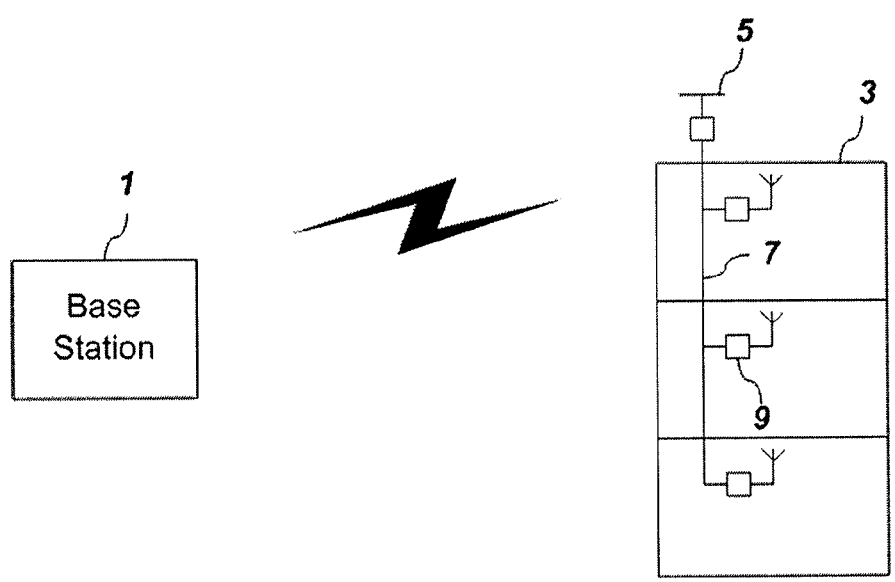
FIG. 1 shows an installation diagram of a general in-building RF repeater.

An exemplary embodiment of the present invention will hereinafter be described in detail with reference to the accompanying drawings. As those skilled in the art would realize, the described embodiments may be modified in various different ways, all without departing from the spirit or scope of the present invention. In order to clarify the embodiments of the present invention, parts that are not related to the description on the present invention will be omitted, and same parts will have the same reference numerals.

Figure 2:
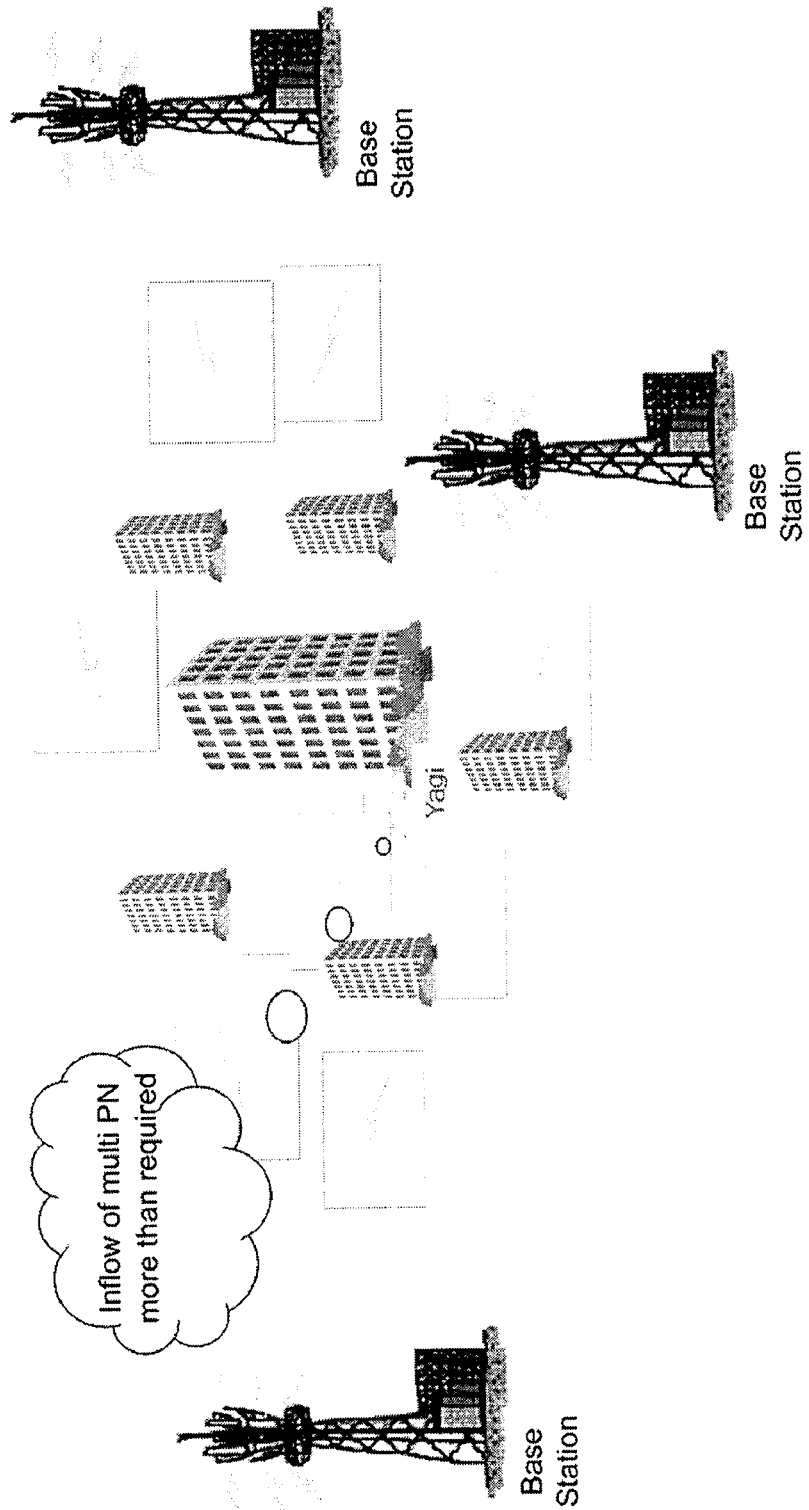
FIG. 2 shows a case of pollution by multi-PNs outside a building.

Since signals generated by many base stations simultaneously reach the outside of the building, that is the rooftop, the rooftop is a PN pollution area because of multiple applied PNs as shown in FIG. 2.

The Ec/Io measured by a terminal having an omni-directional antenna is greatly influenced by neighboring sectors, an additional measurement method is required so as to measure the Ec/Io by using a directional link antenna that partially intercepts influences caused by the neighboring sectors.

Figure 3:
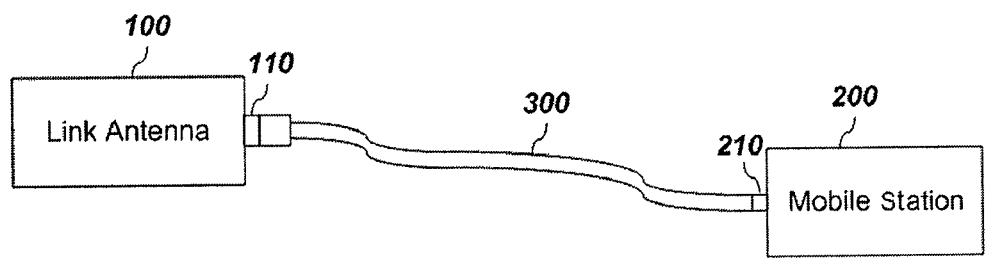
FIG. 3 shows a device used for an installation position of a link antenna of an in-building RF repeater and for a selection of direction according to an embodiment of the present invention.

Therefore, the position for installing the link antenna will be selected by using the device shown in FIG. 3. In this instance, selection of position at which the link antenna will be installed includes selection of a specific position at which the link antenna will be installed from among target areas and selection of a specific direction directed by the link antenna after installing the link antenna at the specific position.

FIG. 3 shows a device used for selecting an installation position of a link antenna of an in-building RF repeater according to an embodiment of the present invention.

As shown in FIG. 3, a device for selecting the installation position of the link antenna of the in-building RF repeater according to an embodiment of the present invention includes a link antenna 100, a mobile station 200, and an access cable 300.

The link antenna 100 is part of the in-building RF repeater and is installed outside the building, for example, the rooftop. The link antenna 100 includes a feeder 110 for connecting to a remote unit (not shown) in the building through a coaxial cable.

The mobile station 200 measures and displays the Ec/Io and RSSI and includes an RF port 210 for RF signal communication with a predetermined device.

The access cable 300 is connected to the feeder 110 of the link antenna 100 and the RF port 210 of the mobile station 200 to function as an RF signal transmission path so that the link antenna 100 may be operated as a signal transmit/receive antenna of the mobile station 200.

Figure 4:
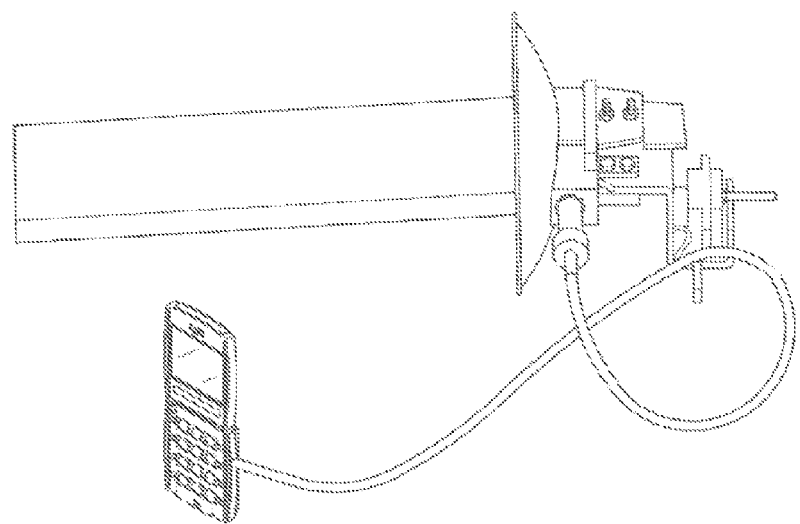
FIG. 4 shows an exemplified realization of the device shown in FIG. 3.

The Yagi antenna is used for the link antenna 100, and FIG. 4 shows an exemplified device for connecting the Yage antenna 100 and the mobile station 200 to the access cable 300 and selecting the installation position of the link antenna of the in-building RF repeater according to an embodiment of the present invention. Further, various antennas including a patch antenna, a sector antenna, and a parabolic antenna can be used for the link antenna 100.

In this instance, the Yagi antenna can be a general Yagi antenna, or it can be a Yagi antenna further including a reflector for preventing other PN's interference provided from the rear direction of the Yagi antenna and a tilt function for controlling the Yagi antenna in the up and down directions as well as in the right and left directions.

As shown in FIG. 5, the access cable 300 includes an N-type connector 310 connected to the feeder 110 of the link antenna 100, an RF jack 320 connected to an RF port 210 of the mobile station 200, an RF cable 330 being connected between the N-type connector 310 and the RF jack 320 and transmitting RF signals between the link antenna 100 and the mobile station 200, and protection tubes 340 and 350 for protecting parts of the RF cable 330 connected to the N-type connector 310 and the RF jack 320.

In this instance, the protection tubes 340 and 350 use heat shrinkable tubes so as to prevent the problem generated because of a heat shrink by the RF cable 330.

Also, it is desirable to control the length of the protection tube 340 and 350 to be substantially 2±0.2 cm, and the length of the RF cable 330 to be substantially 70 cm.

Referring to FIG. 6 and FIG. 7, a method for selecting a position and a direction for installing a link antenna of the in-building RF repeater according to an embodiment of the present invention will be described.

Referring to FIG. 6, a method for selecting a position for installing a link antenna of the in-building RF repeater will now be described.

A measurement device is assembled and stands by for finding the optimized position at which the link antenna 100 will be installed as shown in FIG. 3 (S100). That is, an N-type connector 310 of the access cable 300 is connected to the feeder 110 of the link antenna 100, and the RF port 210 of the mobile station 200 is connected to the RF jack 320 of the access cable 300 to control the measurement device to stands by for a process.

The measurement device noted in S100 is used at a target position at which the link antenna 100 will be installed, such as a rooftop of the building to measure the Ec/Io at the corresponding position (S110). In this instance, the Ec/Io is measured by the mobile station 200 connected to the link antenna 100, and since the Ec/Io is measured through the link antenna 100 that is a directional antenna, the Ec/Io is different from the Ec/Io that is measured through the conventional omni-directional antenna, and the accuracy of the measured Ec/Io becomes very high.

The Ec/Io is consecutively measured while the mobile station moves to many points of the installation target until the measured Ec/Io becomes the optimized Ec/Io (S120 and S130). In this instance, the optimized Ec/Io means that the measured Ec/Io has the greatest value.

When the measured Ec/Io is the optimized Ec/Io from among the measured values at various positions, the corresponding position is selected to be a position at which the link antenna 100 will be installed (S140), and the link antenna is installed at the corresponding position (S150).

Accordingly, the optimized efficiency is obtained since the installation positioned is selected by using the Ec/Io that is measured through the link antenna 100 in the method for selecting the installation position of the in-building RF repeater in the embodiment of the present invention.

Referring to FIG. 7, a method for selecting a direction directed by the link antenna of the in-building RF repeater will now be described.

As shown in FIG. 3, a measurement device is assembled to stand by for finding the optimized direction of the link antenna 100 that is installed at the optimized position (S200). That is, the N-type connector 310 of the access cable 300 is connected to the feeder 110 of the installed link antenna 100, and the RF jack 320 of the access cable 300 is connected to the RF port 210 of the mobile station 200.

While the link antenna 100 is installed, the Ec/Io in the corresponding direction is measured by using the measurement device of S100 in the predetermined direction (S210). In this instance, the Ec/Io is measured by the mobile station 200 Ec/Io connected to the link antenna 100, and the measured Ec/Io measured through the directional link antenna 100 is different from the Ec/Io measured by the conventional omni-directional antenna, and the accuracy of the measured Ec/Io is greatly increased.

The Ec/Io is continuously measured while moving direction directed by the installed link antenna 100 horizontally or vertically until the measured Ec/Io reaches the optimized Ec/Io (S220 and S230).

When the measured Ec/Io is the optimized one from among those that are measured in many directions, the corresponding direction is selected to be the direction directed by the link antenna 100 (S240), and the link antenna 100 is fixedly installed in the corresponding direction (S250). In this instance, the optimized Ec/Io represents that the measured Ec/Io has the greatest value.

Accordingly, the Ec/Io that is measured through the actually used link antenna 100 is used in the direction selecting method of the in-building RF repeater, and the direction thereof is selected to generate the optimized efficiency.

In the above, the processes for selecting the installation position and the direction on the link antenna 100 have been described with reference to FIG. 6 and FIG. 7, which can also be performed consecutively other than individual performance. That is, it is also possible to continuously connect the mobile station 200 connected to the link antenna 100 through the access cable 300 while the optimized position for installing the link antenna 100 and the link antenna 100 is installed according to FIG. 6, and to start the step of S210 shown in FIG. 7 and perform the process for selecting the optimized direction directed by the link antenna 100 after the link antenna is installed.

Accordingly, in the method for selecting the installation position and the direction of the link antenna 100 according to the embodiment of the present invention, the Ec/Io that is measured through the link antenna 100 is used to select the optimized position for installing the link antenna 100 and the optimized direction to be directed by the link antenna 100 at the position so that the RF signals are transmitted and received in the optimized manner to the base station through the link antenna 100, and the signals are used to provide a mobile communication service to the mobile station of the user who stays in the building through the remote unit in the building and thereby provide the optimized service.

Results acquired by installing the link antenna and measuring the Ec/Io in the actual area according to the method for selecting the installation position and the direction of the link antenna according to the embodiment of the present invention will now be described.

In the actual measurement, the installation positions and the directions of the link antenna of the in-building RF repeater are selected at ten places in the Kangnam District in Seoul, the link antenna is installed at the places, and the actual data are measured through a mobile station in the building according to the embodiment of the present invention (measurement after improvement). Also, previous data are actually measured through the mobile station serviced by the conventional link antenna that is installed before the link antenna according to the embodiment of the present invention is installed at the ten places (measurement before improvement).

FIG. 8 and FIG. 9 show measurement results graphs with reference to the time with the number of least users in the Kangnam Center Building from among ten specific places, FIG. 8 showing the measurement result graph before improvements and FIG. 9 showing the measurement result graph after improvements.

As known from the results of FIG. 8 and FIG. 9, the Ec/Io at the measured location before improvements is substantially −8.8 dB, and the Ec/Io at the same location after improvement is substantially −3.8 dB, showing that the Ec/Io is improved by 5 dB. That is, it is known that the quality of the mobile communication service provided to the user has been improved.

FIG. 10 and FIG. 11 show results of actual measurement for the total time frames in the Kangnam Center building that is the same used in FIG. 8 and FIG. 9, FIG. 10 showing the measurement result graph before improvement and FIG. 11 showing the measurement result graph after improvement.

As known from the results of FIG. 10 and FIG. 11, the Ec/Io at the measured location before improvements is substantially −9.9 dB, and the Ec/Io at the same location after improvement is substantially −5.1 dB, showing that the Ec/Io is improved by 4.8 dB. That is, it is known that the quality of the mobile communication service provided to the user has been improved, and is further improved compared to that at the least busy time FIG. 12 shows comparison results of measurement data before improvement and measured data after improvement with reference to the least busy time and the total time at the ten places where the measurement process is performed according to an embodiment of the present invention.

FIG. 12 shows that the improvement is provided with the range from the minimum of 2.5 dB to the maximum of 4.8 dB with reference to the least busy time, showing that the embodiment of the present invention generates great effects.

Also, it is known from FIG. 12 that the improvement is increased to the range from the minimum of 1.7 dB to the maximum of 5.4 dB with reference to the total time frame, providing great effects.

It is described to select the optimized position and direction by using the Ec/Io that is measured by using the mobile station 200 connected to the link antenna 100 through the access cable 300, and the scope of the present invention is not restricted to this description. For example, the transmission power (Tx_pwr) and the transmission adjust (Tx_adj) in addition to the Ec/Io can be measured in the mobile station 200, and the efficiency caused by the embodiment of the present invention is generated at the position or direction having the measured Tx_pwr or Tx_adj. Therefore, the position and the direction having the Ec/Io, Tx_pwr, and Tx_ajs measured by using the mobile station 200 connected to the link antenna 100 through the access cable 300, that is, the optimized values for showing the status or performance of the mobile station 200 can be selected by using the installation position and the direction of the link antenna 100.

Also, it is described in the above that the Ec/Io is measured by using the mobile station 200 connected to the link antenna 100 through the access cable 300, and in addition to this, the scope of the present invention is applicable to terminals having a Qualcomm chip, an Ericsson chip, and a Cyrix chip, which is well known to a person of an ordinary skill in the art.

Therefore, the position and the direction for installing the link antenna 100 can be selected by using a dedicated terminal in which the above-noted modem chip is installed other than installing the link antenna 100 by using the mobile station 200.

A dedicated terminal for the method of selecting the position of installing the link antenna according to the embodiment of the present invention will now be described differing from the general mobile station 200.

The configuration of the dedicated terminal can be simplified compared to that of the mobile station 200 since it is needed for the dedicated terminal to have a function for measuring a value of indicating the state and performance of the dedicated terminal at a specific place and displaying the value so as to select the installation position of the link antenna. That is, additional service functions such as a multimedia function, a camera function, and an MP3 function used by the mobile station 200 are not needed, and hence, the configuration for the above-noted functions can be eliminated.

FIG. 13 shows a block diagram for a dedicated terminal for selecting the installation position of the link antenna according to an embodiment of the present invention.

As shown in FIG. 13, the dedicated terminal 400 includes a controller 410, a dedicated keypad 420, a display 430, a memory 440, a link antenna connector 450, and a wireless transmitting/receiving unit 460.

The controller 410 controls the function for the dedicated terminal 400 to be connected to the link antenna 100 directly or though a specific cable and measure values for indicating various states or performances used for selecting the installation position of the link antenna 100.

The dedicated keypad 420 receives an instruction from a user and transmits the same to the controller 410. The configuration of the dedicated keypad 420 is different from that of the mobile station 200. That is, the dedicated terminal 400 is used to select the installation position of the link antenna 100 so that there is no need to provide various additional functions such as a voice call function, a data communication function, and a message transmitting/receiving function differing from the mobile station 200, and the dedicated keypad 420 may not have numeric keys, character keys, and other keys for providing the above-noted functions.

The dedicated keypad 420 has a key for measuring the value for indicating the state or performance of the dedicated terminal through the link antenna 100. For example, the key includes a scan mode key for the dedicated terminal 400 to initially search for the installation position and the direction of the link antenna by using the Ec/Io and the RSSI in the non-slot mode, and a confirm mode key for the dedicated terminal 400 to search for the installation position and the direction of the link antenna in detail by using the multi PN, Ec/Io, Tx_adj, and RSSI in the traffic state.

The display 430 displays information for controlling the operation of the dedicated terminal 400 or displays values measured for selecting the installation position and the direction of the link antenna 100 according to control by the controller 410. The display provided to the mobile station 200 is applicable to the display 430.

The memory 440 stores a program for the controller 410 to control the operation of the dedicated terminal 400, and stores values that are measured so as to select the installation position or directivity of the link antenna 100.

The link antenna connector 450 is connection means for connecting a cable or a connector so that the dedicated terminal 400 may be connected to the link antenna 100. The link antenna connector 450 is connected to the feeder 110 of the link antenna 100 directly or through a cable, and desirably through the cable.

Referring to FIG. 3, the link antenna 100 is connected to the mobile station 200 through an RF port 210, and the RF port 210 is provided to test the mobile station 200, and particularly to test the maintenance because of a malfunction, and hence, the RF port 210 cannot be used for a long term because of heavy abrasion when it is frequently used so as to install the link antenna 100. Therefore, the link antenna connector 450 installed in the dedicated terminal 400 must have a firm connector for a frequent connection with the link antenna 100. For this purpose, an SMA connector is used for the link antenna connector 450 in the embodiment of the present invention, and for example, an internal type female terminal is used for the female terminal of the SMA connector.

The wireless transmitting/receiving unit 460 converts the data transmitted by the controller 410 into mobile communication signals and transmits the signals through the link antenna connector 450, receives mobile communication signals from the link antenna connector 450, converts the signals into data available by the controller and then transmits the converted signals to the controller 410.

Since the link antenna connector 450 of the dedicated terminal 400 is different from the RF port 210 of the mobile station 200, the dedicated terminal 400 cannot be connected to the link antenna 100 through the access cable 300 described with reference to FIG. 5. Therefore, the part connected to the RF port 210 of the mobile station 200 in the access cable 300 is to be controlled to be connected to the link antenna connector 450 of the dedicated terminal 400. For example, when the link antenna connector 450 is formed with an SMA female terminal and the part corresponding to the access cable 300 is formed with an SMA male terminal of the same standard, the dedicated terminal 400 can be easily connected to the link antenna 100.

The controller 410 can be realized with a modem chip for generating mobile communication traffic, for example, a Qualcomm chip, an Ericsson chip, and a Cyrix chip. However, it is required for the controller 410 to have a function for measuring values of indicating states or performance of the dedicated terminal 400 used for selecting the position of the link antenna 100, for example, Ec/Io, RSSI, multi PN, Tx_pwr, and Tx_adj, and hence, there is no need to realize various additional service functions such as a multimedia function, a camera function, and an MP3 function. Therefore, the unnecessary functions can be eliminated from the existing modem chip.

FIG. 14 shows an external case for the above-configured dedicated terminal 400.

As shown in FIG. 14, a dedicated keypad 420, a display 430, and a link antenna connector 450 are formed on the external case of the dedicated terminal 400 so that they may be found outside. Particularly, the dedicated keypad 420 has a scan mode key and a confirm mode key.

A method for selecting the installation position of the link antenna by using the dedicated terminal 400 according to an embodiment of the present invention will now be described.

When the link antenna 100 and the dedicated terminal 400 are connected and a scan mode key of the dedicated keypad 420 is selected in the target area for installing the link antenna 100, the Ec/Io is measured in the non-slot mode at the initial search to display the measurement result to the display 430. In this instance, the measured values can be displayed as in the case of the mobile station 200, and the dedicated terminal 400 according to the embodiment of the present invention converts and displays the same to the users who do not fully know the contents of the measured value so that the users may easily install the link antenna 100. For example, the states of the dedicated terminal 400 detected through the measured Ec/Io are classified as the best state, the good state, and a bad state, and the states are converted into states that correspond to the actually measured values and the converted states are then displayed. Therefore, the users who select the installation position of the link antenna 100 by using the dedicated terminal 400 can initially search for the position of installing the link antenna 100 by using the scan mode key in the target area. That is, the users can initially search for the position for displaying the optimized state by using the scan mode key.

When the confirm mode key of the dedicated keypad 420 is selected so as to confirm the optimized position for installing the link antenna 100 at respective positions displaying the optimal states, the multi PN, Ec/Io, Tx_adj, and RSSI are measured in the traffic state to display the measured values on the display 430. In this instance, the measured values can be displayed in a like manner of the mobile station 200, and in addition to this, the values are converted and displayed to indicate the states or performance of the measured values so that the users who do not sufficiently know the contents of the measured values may easily install the link antenna 100.

Therefore, the users who select the installation position of the link antenna 100 by using the dedicated terminal 400 can confirm the optimized position for installing the link antenna 100 in the position of the initially searched optimized position by using the confirm mode key.

In the case of selecting the direction of the link antenna 100 by using the dedicated terminal 400, the direction is initially searched by using the scan mode key, and the optimized direction can be confirmed from among the initially searched directions by using the confirm mode key.

It is described in the above that the dedicated terminal 400 selects the installation position and the direction of the link antenna 100 by using a single communication method, and without being restricted to this, the dedicated terminal 400 can be configured to have a structure that is similar to that of a frequently used dual mode terminal. That is, as shown in FIG. 15, the wireless transmitting/receiving unit 460 of the dedicated terminal 400 includes dual-mode wireless transmitting/receiving units 460. For example, the wireless transmitting/receiving unit 460 includes a CDMA wireless transmitting/receiving unit 461 and a WCDMA wireless transmitting/receiving unit 462. Therefore, when the communication method serviced through the link antenna 100 to be installed is selected through the dedicated keypad 420, the controller 410 can perform a wireless communication by using the wireless transmitting/receiving unit 460 corresponding to the selected communication method. It is well known to a person of an ordinary skill in the art that the above-noted configuration is applicable to at least three communication methods.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

According to the embodiment of the present invention, the link antenna of the in-building RF repeater can be installed at the optimized position.

Further, the link antenna of the in-building RF repeater can be installed in the optimized direction.

Accordingly, the Ec/Io, in-building throughputs, RSSI, transmission adjust (Tx_adj), and transmission power (Tx_pwr) within the building can be substantially improved. The RSSI improvement increases forward power of the in-building RF repeater, and increases the coverage of the in-building RF repeater as a result. Also, the Tx_adj improvement improves the backward path so thus maintain the quality with the terminal's less power, and the output of the backward power amplifier of the in-building RF repeater is reduced to thus minimize the degradation of the backward power amplifier.

Also, the PN pollution generated outside can be eliminated.

Also, the RF load ratio of the network wireless load ratio is substantially reduced, and the load ratios of the base station LPA, transceiver, channel card, and private lines of the network wire load ratio is substantially reduced.

Therefore, the quality that the users undergo is improved, and the load of the in-building RF repeater can be reduced.

Also, the total cost including labor costs for installing the in-building RF repeater is reduced.

What is claimed is:

1. A method for selecting an installation position of a link antenna of an in-building RF repeater using a terminal, the method comprising:
    measuring, by the terminal connected to the link antenna through a predetermined access cable, a communication state value in a non-slot mode representing operations during idle timeslots by using directivity of the link antenna at a predetermined position within a target area for installing the link antenna, wherein the terminal has an omni-directional antenna;
    comparing a previously measured communication state value with the communication state value that is measured by repeating the measuring step at another position within the target area;
    converting, by the terminal, the communication state value into one of a plurality of states, each of the plurality of states corresponding to the measured communication state value;
    displaying, on a display of the terminal, at least one of (i) the communication state value and (ii) the converted states; and
    selecting the position with the greatest communication state value as a position for installing the link antenna.

2. The method of claim 1, wherein the terminal for measuring the communication state value generates mobile communication traffic through the link antenna.

3. The method of claim 1, wherein the communication state value is one of the energy per chip over interface noise (Ec/Io), transmission power (Tx_pwr), and transmission adjust (Tx_adj) measured from the terminal.

4. The method of claim 1, wherein the predetermined access cable is connected to a feeder of the link antenna, wherein the feeder connects a coaxial cable for the link antenna to transmit RF signals to a remote unit for providing a mobile communication service within the building.

5. The method of claim 4, wherein the predetermined access cable is connected to an RF port for controlling RF transmitting/receiving to/from the terminal.

6. The method of claim 1, wherein the predetermined access cable is an RF cable for controlling RF signal transmission between the link antenna and the terminal.

7. The method of claim 1, further comprising:
    measuring a communication state value by using the directivity of the link antenna in a predetermined direction within a target direction to be directed by the link antenna that is installed at the position selected in the selecting step;
    comparing a previously measured communication state value with the communication state value that is measured by repeating the measuring step of a communication state value in another direction within the target area; and
    selecting the direction with the greatest communication state value measured in the target direction as a direction to be directed by the link antenna.

8. The method of claim 1, wherein the link antenna is on of a Yagi antenna, a patch antenna, a sector antenna, and a parabolic antenna.

9. A method for selecting a direction of a link antenna of an in-building RF repeater using a terminal, the method comprising:
    measuring, by the terminal connected to the link antenna through a predetermined access cable, a communication state value in a non-slot mode representing operations during idle timeslots by using directivity of the link antenna in a predetermined direction within a target area for installing the link antenna, wherein the terminal has an omni-directional antenna;
    comparing a previously measured communication state value with the communication state value that is measured by repeating the measuring step in another direction within the target area;
    converting, by the terminal, the communication state value into one of a plurality of states, each of the plurality of states corresponding to the measured communication state value;
    displaying, on a display of the terminal, at least one of (i) the communication state value and (ii) the converted states; and
    selecting the direction with the greatest communication state value as a direction to be directed by the link antenna.

10. The method of claim 9, wherein the terminal for measuring the communication state value generates mobile communication traffic through the link antenna.

11. The method of claim 9, wherein the communication state value is one of the energy per chip over interface noise (Ec/Io), transmission power (Tx_pwr), and transmission adjust (Tx_adj) measured from the terminal.

12. The method of claim 9, wherein the predetermined access cable is connected to a feeder of the link antenna, wherein the feeder connects a coaxial cable for the link antenna to transmit RF signals to a remote unit for providing a mobile communication service within the building.

13. The method of claim 12, wherein the predetermined access cable is connected to an RF port for controlling RF transmitting/receiving to/from the terminal.

14. The method of claim 9, wherein the predetermined access cable is an RF cable for controlling RF signal transmission between the link antenna and the terminal.

15. The method of claim 9, wherein the link antenna is one of a Yagi antenna, a patch antenna, a sector antenna, and a parabolic antenna.

16. A terminal having an omni-directional antenna for selecting an installation position of a link antenna of an in-building RF repeater, the terminal comprising:
- a keypad for receiving and transmitting a user instruction for selecting an installation position of the link antenna;
- a display for displaying communication state values for displaying the terminal's states and performance;
- a link antenna connector connectable to the link antenna so that RF signals may be transmitted between the link antenna and the terminal;
- a wireless transmitting/receiving unit for transmitting/receiving RF signals to/from the link antenna through the link antenna connector; and
- a controller for measuring the terminal's communication state value through the link antenna connected to the link antenna connector through a predetermined access cable when a user instruction is input through the keypad, wherein the controller measures the communication state value measured in a non-slot mode representing operations during idle timeslots, divides the terminal state into a plurality of states, converts the communication state value into one of a plurality of states, each of the plurality of states corresponding to the measured communication state value, and displays at least one of (i) the communication state value and (ii) the converted states to the display, so as to initially select the position for installing the link antenna and the direction thereof.

17. The terminal of claim 16, wherein the controller measures the communication state value in the traffic state and displays the same through the display so as to confirm the position for installing the link antenna and the direction thereof.

18. The terminal of claim 17, wherein the confirmed position for installing the link antenna and the direction thereof is selected from among the initially selected positions and directions.

19. The terminal of claim 17, wherein the keypad comprises a scan mode key for receiving a communication state value measuring instruction for the initial selection, and a confirm mode key for receiving a communication state value measuring instruction for the confirmation.

20. The terminal of claim 16, wherein the wireless transmitting/receiving unit comprises a plurality of wireless transmitting/receiving means for performing wireless communication, and one of the wireless transmitting/receiving means is selected by the controller according to the user's input through the keypad.

* * * * *